United States Patent
Godfrey et al.

[11] Patent Number: 5,873,440
[45] Date of Patent: Feb. 23, 1999

[54] BEARING AND BRAKE SUPPORT ASSEMBLY

[75] Inventors: William H. Godfrey, Yorkville; Roger E. Ory, Naperville; Mark E. Weiss, Downers Grove, all of Ill.

[73] Assignee: Caterpillar Inc., Peoria, Ill.

[21] Appl. No.: 832,995

[22] Filed: Apr. 4, 1997

[51] Int. Cl.$^6$ .............................. B60K 17/24; F16D 51/00
[52] U.S. Cl. ..................... 192/4 R; 188/205 R; 280/400; 384/475
[58] Field of Search ..................................... 192/4 R, 4 A, 192/218; 74/411.5, 665 A; 188/78, 341, 205 R, 206 R, 206 A; 180/244, 370; 384/475, 904, 906; 280/400

[56] References Cited

U.S. PATENT DOCUMENTS

| | | | |
|---|---|---|---|
| 2,441,294 | 5/1948 | Shafer | 384/475 |
| 3,505,904 | 4/1970 | Williams, Jr. | 192/4 A X |
| 3,820,638 | 6/1974 | Ebey | 188/206 A |
| 4,476,968 | 10/1984 | Urban et al. | 188/341 X |
| 4,858,730 | 8/1989 | Baroni | 188/205 R |

OTHER PUBLICATIONS

Parts, Jul. 1990, 966F Wheel Loader Power Train Parts Book—p. 144.

*Primary Examiner*—Richard M. Lorence
*Attorney, Agent, or Firm*—Maginot, Addison & Moore

[57] ABSTRACT

A bearing and brake support assembly includes a drive shaft and a bearing assembly. The bearing assembly has an inner race and an outer race. The inner race is secured around the drive shaft. The bearing and brake support assembly further includes a one-piece housing having a central passage extending therethrough. The outer race of the bearing assembly is secured to the one-piece housing at a location within the central passage. The bearing and brake support assembly further includes a yoke secured to the drive shaft. The bearing and brake support assembly moreover includes a brake drum secured to the yoke. The bearing and brake support assembly also includes a brake shoe assembly secured to the one-piece housing. The brake shoe assembly cooperates with the brake drum so as to selectively prevent rotation of the drive shaft.

20 Claims, 6 Drawing Sheets

BEARING AND BRAKE SUPPORT ASSEMBLY

BACKGROUND OF THE INVENTION

The present invention relates generally to drive linkages, and more particularly to a bearing and brake support assembly which is used in a drive linkage.

Many articulating work machines such as wheel loaders include frames and drive shaft assemblies configured so as to cooperate with one another during articulation. In particular, many articulating work machines include a front drive linkage which has a separate drive shaft connected to a center drive or slip shaft via a universal joint in order to provide the necessary clearance from the frame of the articulating work machine during articulation. Such a configuration often requires a bearing assembly, known commonly as a midship bearing assembly, to be integrated into the front drive linkage. The midship bearing assembly functions to absorb radial thrusts and forces exerted upon the drive shaft during articulation of the articulating work machine, thereby preventing non-rotational movement of the front drive shaft.

Moreover, a number of midship bearing assemblies have heretofore been designed to include a support member to which a known drum brake assembly is fastened. The drum brake assembly functions to selectively restrict rotational movement of the drive shaft thereby functioning as a parking brake.

These midship bearing assemblies which have heretofore been designed are complex and often include a large number of components thereby causing the midship bearing assemblies to be relatively difficult and expensive to manufacture. As a result, efforts have been made to simplify the design of the midship bearing assembly. However, such efforts have had only limited success. In particular, efforts to reduce the number of components included in the midship bearing assembly have resulted in removal of the support member to which the drum brake assembly is secured thereby necessitating relocation of the parking brake function to another location on the drive shaft assembly of the articulating work machine such as the transmission. Such relocation may require redesign of other components (e.g. the transmission) thereby increasing the cost associated with manufacturing of the articulating work machine.

What is needed therefore is a bearing and brake support assembly which is relatively simple and inexpensive to manufacture. What is further needed is a bearing and brake support assembly that includes a relatively small number of components.

SUMMARY OF THE INVENTION

In accordance with one embodiment of the present invention, there is provided a bearing and brake support assembly. The bearing and brake support assembly includes a drive shaft and a bearing assembly. The bearing assembly has an inner race and an outer race. The inner race is secured around the drive shaft. The bearing and brake support assembly further includes a one-piece housing having a central passage extending therethrough. The outer race of the bearing assembly is secured to the one-piece housing at a location within the central passage. The bearing and brake support assembly further includes a yoke secured to the drive shaft. The bearing and brake support assembly moreover includes a brake drum secured to the yoke. Yet further, the bearing and brake support assembly includes a brake shoe assembly secured to the one-piece housing. The brake shoe assembly cooperates with the brake drum so as to prevent rotation of the drive shaft.

In accordance with a second embodiment of the present invention there is provided a bearing and brake support assembly. The bearing and brake support assembly includes a one-piece housing having a central passage extending therethrough. The bearing and brake support assembly further includes a bearing assembly secured within the central passage. Moreover, the bearing and brake support assembly includes a brake shoe assembly secured to the one-piece housing.

It is therefore an object of the present invention to provide a new and useful bearing and brake support assembly.

It is another object of the present invention to provide an improved bearing and brake support assembly.

It is moreover an object of the present invention to a provide bearing and brake support assembly which is relatively simple and inexpensive to manufacture.

It is yet another object of the present invention to provide a bearing and brake support assembly which includes a relatively small number of components.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
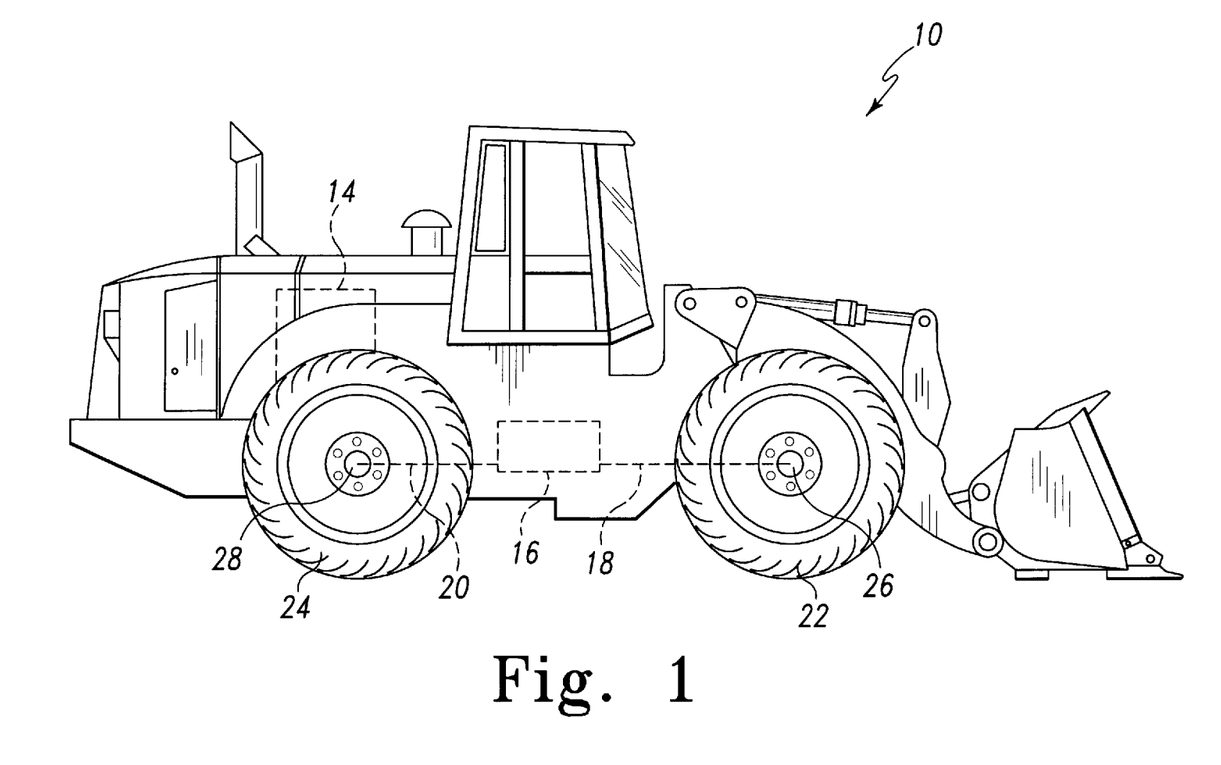
FIG. 1 is a side elevational view of an articulating work machine which incorporates the features of the present invention therein.

Referring now to FIG. 1, there is shown an articulating work machine or wheel loader 10. The wheel loader 10 includes an engine 14, a transmission 16, a front drive linkage 18, a rear drive linkage 20, a pair of front wheels 22, and a pair of rear wheels 24. The front wheels 22 and the rear wheels 24 are coupled to a front drive axle 26 and a rear drive axle 28, respectively.

The engine 14 is operatively coupled to the transmission 16 via a mechanical linkage (not shown) thereby providing the motive power for moving the wheel loader 10. The transmission 16 is operatively coupled to the front wheels 22 and the rear wheels 24 via the front drive linkage 18 and the rear drive linkage 20, respectively. In particular, a first end of the front drive linkage 18 is coupled to the transmission 16, whereas a second end is operatively coupled to the front drive axle 26. In addition, a first end of the rear drive linkage 20 is coupled to the transmission 16, whereas a second end is operatively coupled to the rear drive axle 28.

Therefore, rotation of a first output shaft 30 (see FIG. 2) of the transmission 16 causes the front drive linkage 18 to rotate, which in turn rotates the front drive axle 26 and hence the front wheels 22. Similarly, rotation of a second output shaft (not shown) of the transmission 16 causes the rear drive linkage 20 to rotate, which in turn rotates the rear drive axle 28 and hence the rear wheels 24.

Figure 2:
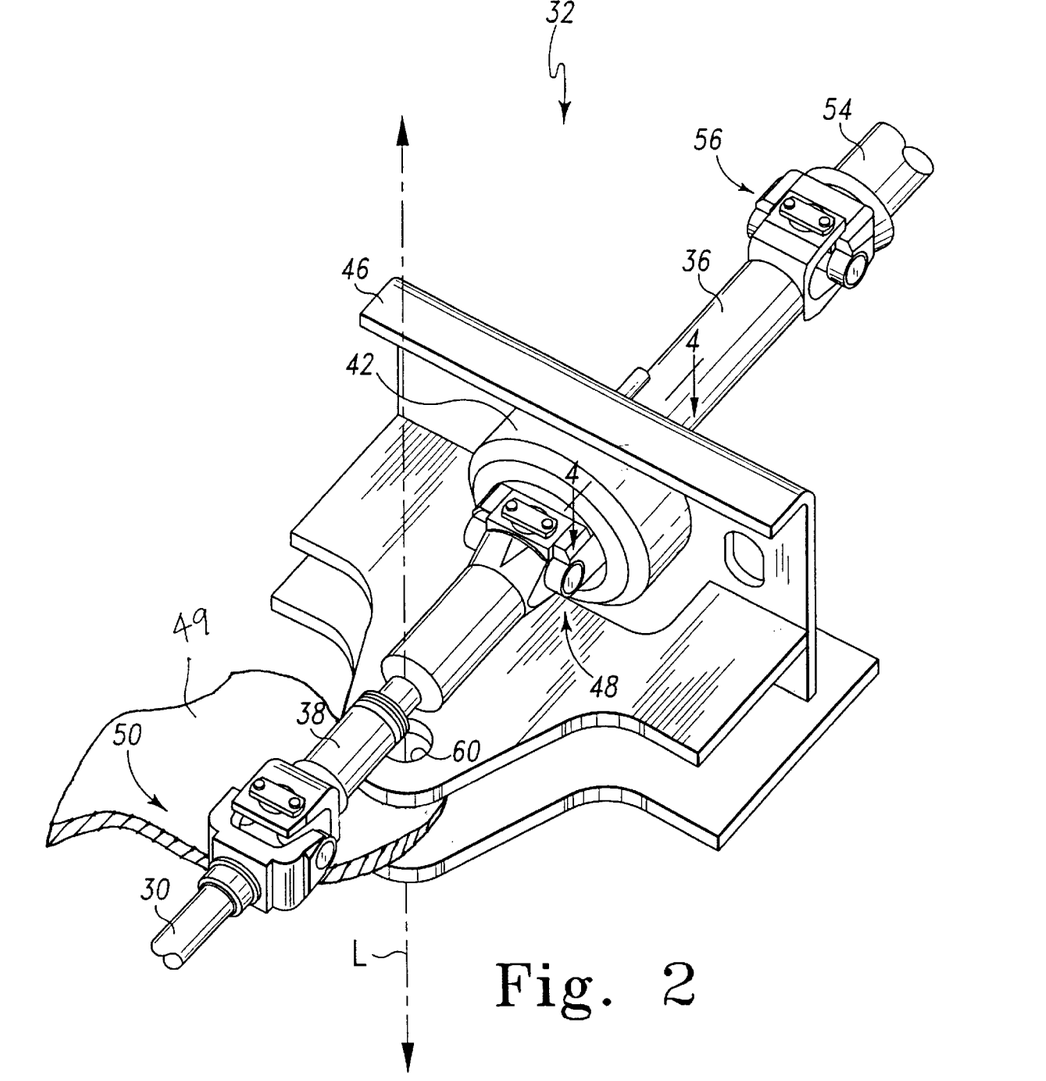
FIG. 2 is a perspective view of a bearing and brake support assembly of the articulating work machine of FIG. 1.
Figure 3:
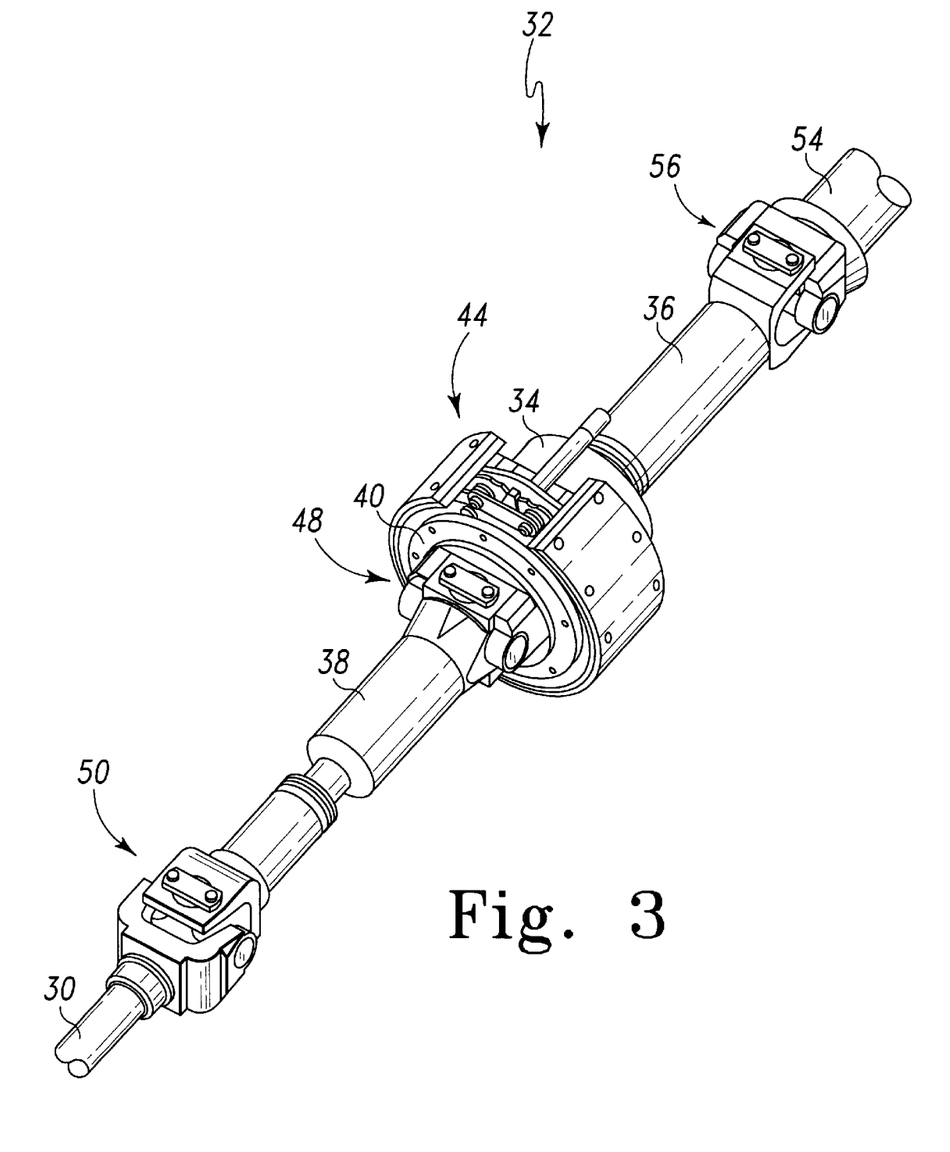
FIG. 3 is a view similar to FIG. 2, but having the frame and the brake drum removed for clarity of description.

Referring now to FIGS. 2 and 3, there is shown a bearing and brake support assembly 32 of the front drive linkage 18. The bearing and brake support assembly 32 includes a one-piece housing 34, a drive shaft 36, a slip shaft 38, a yoke 40, a brake drum 42, a brake shoe assembly 44, and a frame 46.

A first end of the slip shaft 38 is coupled to the yoke 40 via a universal joint group 48, whereas a second end of the slip shaft 38 is coupled to the output shaft 30 of the transmission 16 (see FIG. 1) via a universal joint group 50. A chassis 49 of the wheel loader 10 articulates about an axis defined by the line L which aligns with center points of a number of holes 60 defined in the frame 46. It should be appreciated that the slip shaft 38 cooperates with the universal joint groups 48 and 50 so as to permit similar articulation of the front drive linkage 18.

Figure 4:
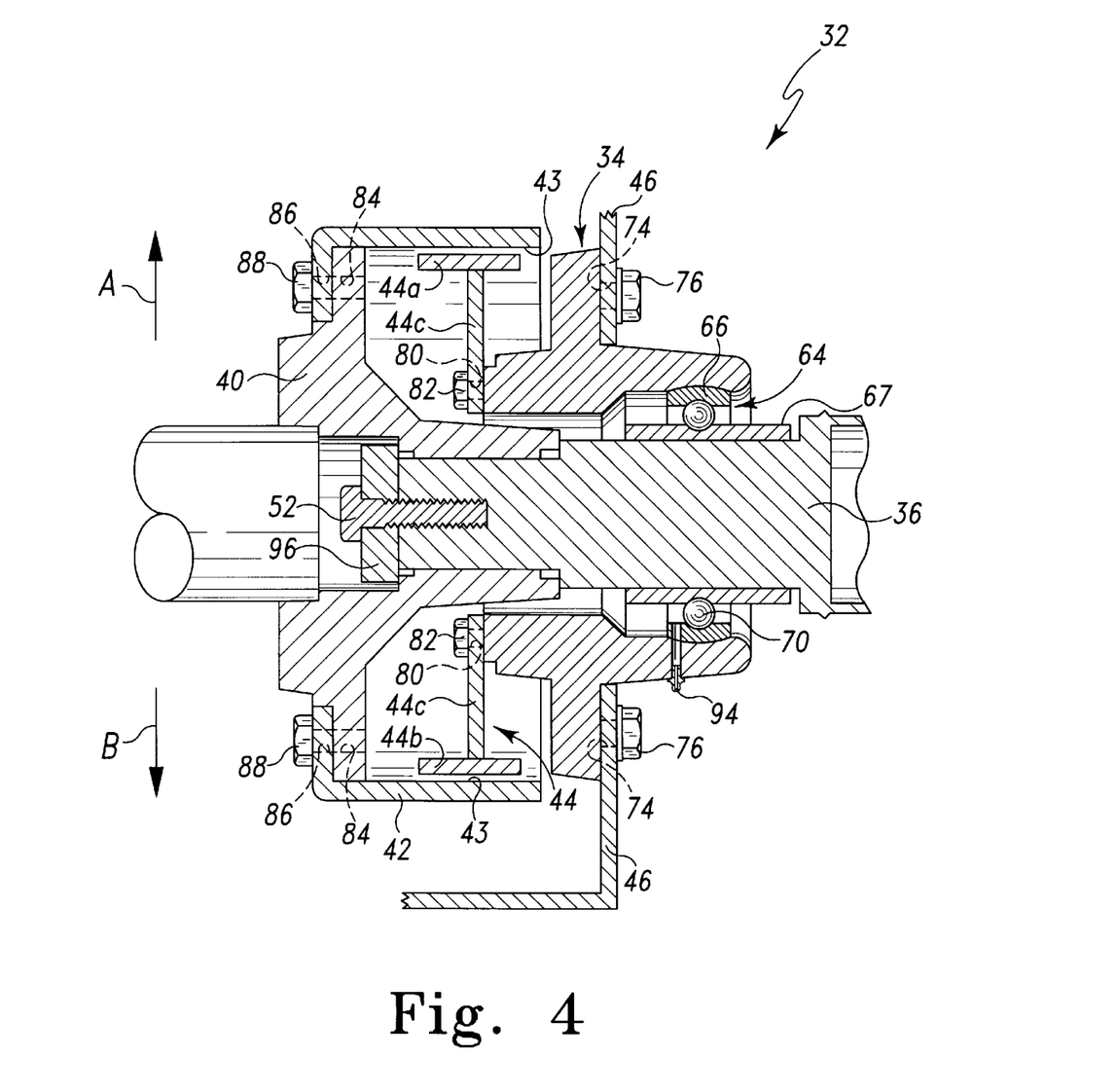
FIG. 4 is a fragmentary cross sectional view taken along the line 4—4 of FIG. 2, as viewed in the direction of the arrows.

The yoke 40 is coupled to a first end of the drive shaft 36 via a shaft bolt 52 (see FIG. 4). Hence, rotation of the yoke 40 causes the drive shaft 36 to be likewise rotated. A second end of the drive shaft 36 is coupled to an input shaft 54 of a differential assembly (not shown) via a universal joint group 56. Two output or half shafts (not shown) of the differential assembly function as the front drive axle 26 (see FIG. 1). Therefore, rotation of the drive shaft 36 causes the axle 26 and hence the front wheels 22 (see FIG. 1) to be likewise rotated.

As shall be discussed in more detail below, the one-piece housing 34 is non-rotably secured to the frame 46, and receives the first end of the drive shaft 36 therein. The brake shoe assembly 44 is non-rotably secured to the one-piece housing 34. Hence, the drive shaft 36 rotates relative the one-piece housing 34 and the brake shoe assembly 44.

The brake drum 42 is connected to the yoke 40. Therefore, rotation of the yoke 40 causes the brake drum 42 to be likewise rotated. The brake drum 42 cooperates with the brake shoe assembly 44 so as to selectively prevent rotation of the drive shaft 36 and the slip shaft 38.

Figure 5:
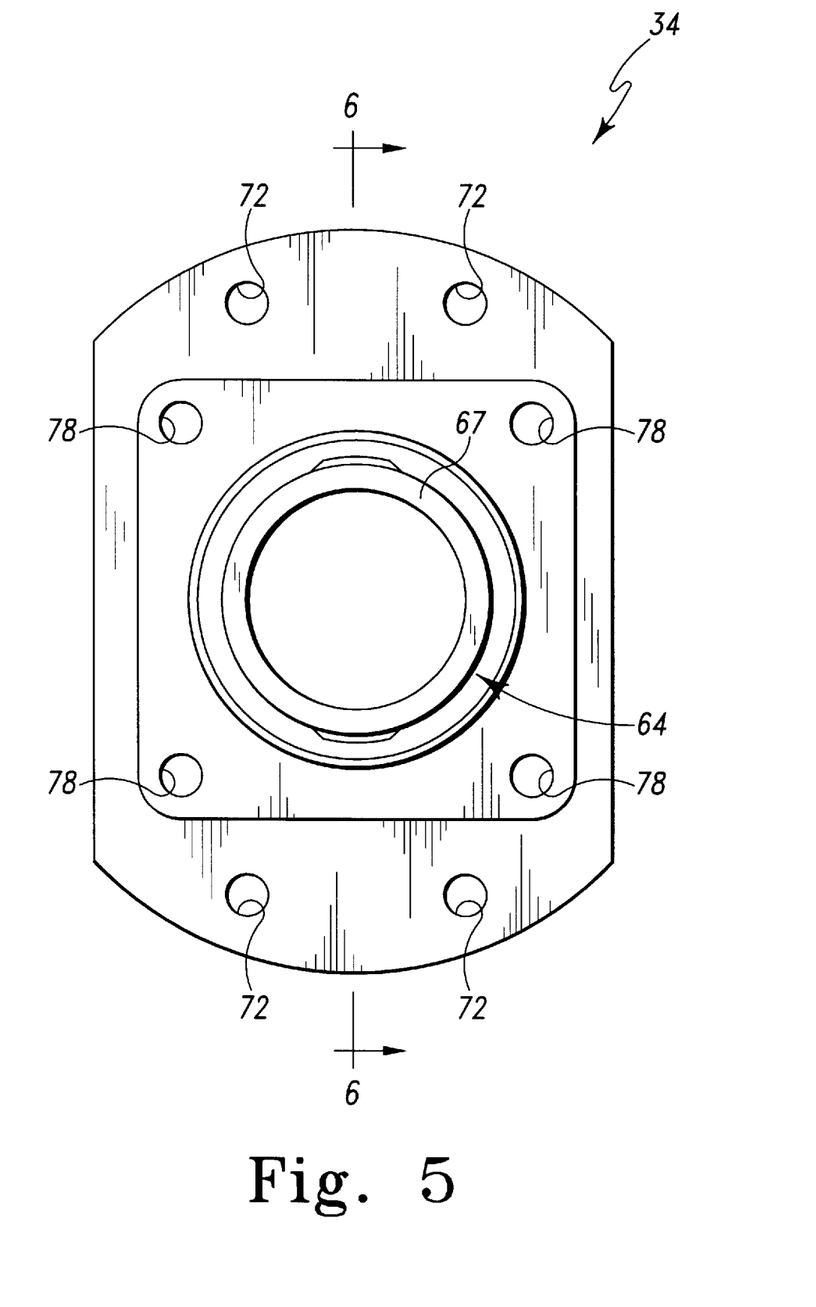
FIG. 5 is a front elevational view of the one-piece housing of the bearing and brake support assembly of FIG. 2.
Figure 6:
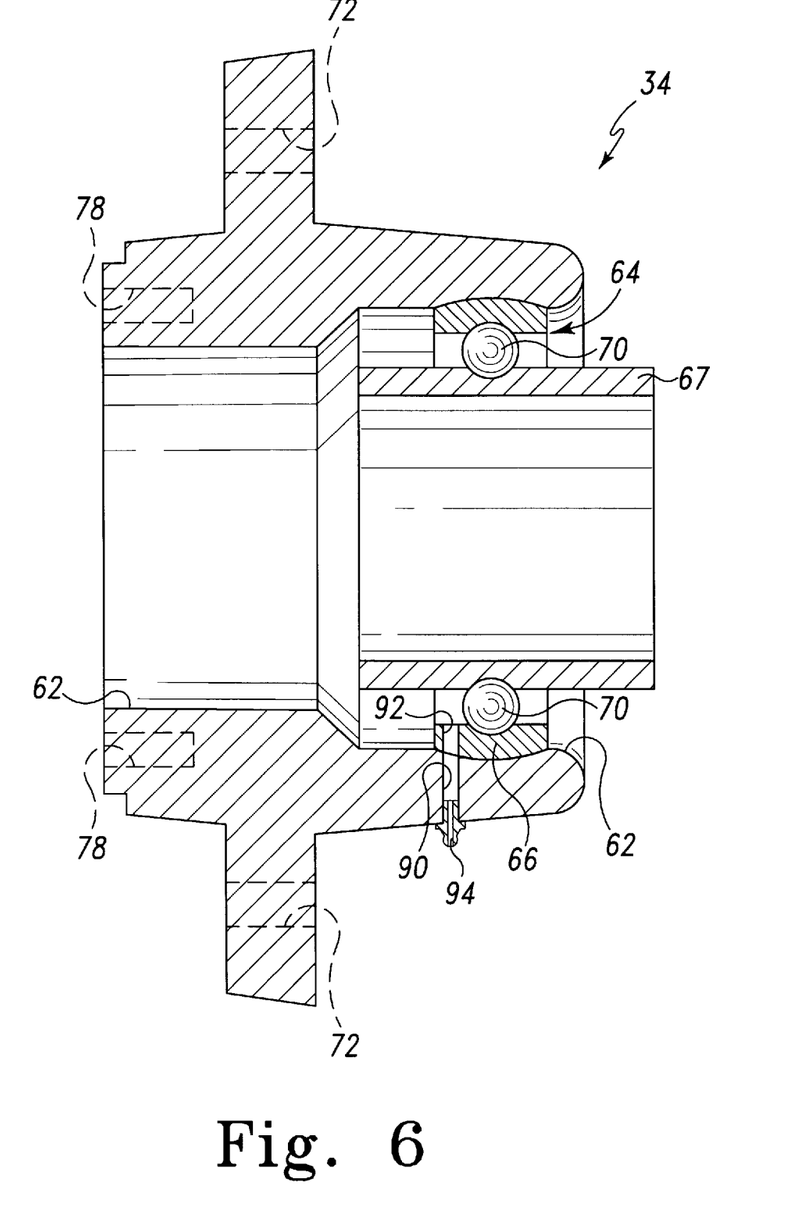
FIG. 6 is a cross-sectional view of the one-piece housing of FIG. 5, as viewed in the direction of the arrows.

Referring now to FIGS. 4–6, there is shown the bearing and brake support assembly 32. Note that in FIGS. 5 and 6, the one-piece housing 34 is shown with the remaining components associated with the bearing and brake assembly 32 removed therefrom for clarity of description.

The one-piece housing 34 is configured as a single part. Hence, use of the one-piece housing 34 eliminates a number of components included in previous bearing and brake support assembly designs thereby simplifying manufacturing of and lowering costs associated with the articulating wheel loader 10. The one-piece housing 34 is made of a ductile iron casting material. One suitable material is an SAE Grade D5506 ductile iron casting material.

In addition, the one-piece housing 34 has a central passage 62 extending therethrough. A bearing assembly 64 is non-rotably secured within the central passage 62. In particular, an outer race 66 of the bearing assembly 64 is secured to an inner surface of the one-piece housing 34 within the central passage 62 as shown in FIG. 4. An inner race 67 of the bearing assembly 64 is secured around the drive shaft 36 as shown in FIG. 4. A plurality of ball bearings 70 are interposed between the inner race 67 and the outer race 66 thereby allowing the inner race 67 and hence the drive shaft 36 to rotate relative the outer race 66 and the one-piece housing 34.

The one-piece housing 34 has a plurality of first apertures 72 (see FIG. 6) defined therein. Moreover, the frame 46 has a plurality of second apertures 74 defined therein. A plurality of first bolts 76 are received through the second apertures 74 and thereafter threadingly engaged into the first apertures 72 thereby securing the one-piece housing 34 to the frame 46.

The one-piece housing 34 further includes a plurality of third apertures 78 (see FIG. 6) defined therein. A first end of a number of brake shoe support members 44c of the brake shoe assembly 44 include a plurality of fourth apertures 80 defined therein. A plurality of second bolts 82 are received through the fourth apertures 80 and thereafter threadingly engaged into the third apertures 78 thereby securing the brake shoe assembly 44 to the one-piece housing 34 and hence the frame 46.

The yoke 40 has a plurality of fifth apertures 84 defined therein. Moreover, the brake drum 42 has a plurality of sixth apertures 86 defined therein. A plurality of third bolts 88 are received through the sixth apertures 86 and thereafter threadingly engaged into the fifth apertures 84 thereby securing the brake drum 42 to the yoke 40.

The one-piece housing further includes a first lubricant channel 90 (see FIG. 6) defined therein. A second lubricant channel 92 is defined in the outer race 66, and is aligned with the first lubricant channel 90 so as to allow a lubricant such as bearing grease to be advanced from a fitting 94 that is positioned in the first lubricant channel 90 to the ball bearings 70.

The first end of the drive shaft 36 is received into the inner race 67 and secured thereto as shown in FIG. 4. Thereafter, the first end of the drive shaft 36 is coupled to the yoke 40 via a retainer 96 and the shaft bolt 52. Therefore, the drive shaft 36, the yoke 40, and the brake drum 42 rotate relative the one-piece housing 34 and the frame 46.

In operation, rotation of the output shaft 30 (see FIG. 2) of the transmission 16 (see FIG. 1) causes the slip shaft 38 (see FIG. 2), the yoke 40, and the drive shaft 36 to rotate, which in turn rotates the front drive axle 26 (see FIG. 1). If the wheel loader 10 is articulated while the drive shaft 36 is rotating (i.e. the front wheels 22 are turned while the wheel loader 10 is in motion), a radial thrust or force is exerted on the drive shaft 36. The frame 46, via the bearing assembly 64 and the one-piece housing 34, absorbs the radial force exerted on the drive shaft 36, thus preventing non-rotational movement of the drive shaft 36.

If an operator of the wheel loader 10 desires to prevent the wheel loader 10 from rolling or otherwise moving during periods of nonuse thereof, the operator activates a parking brake lever (not shown) or the like which is operatively coupled to the brake shoe assembly 44. Thereafter, a brake shoe 44a is urged in the general direction of arrow A in FIG. 4, and a brake shoe 44b is urged in the general direction of arrow B in FIG. 4. The brake shoes 44a and 44b are urged in the respective directions until the brake shoes 44a and 44b contact an inner surface 43 of the brake drum 42. Thereafter, the brake shoes 44a and 44b are retained in contact with the inner surface 43 of the brake drum 42 thereby transferring the rotational torque from the brake drum 42 and hence the drive shaft 36 to the frame 46. Hence, rotational movement of the drive shaft 36 and the front wheels 22 will be prohibited until the operator deactivates or otherwise releases the parking brake lever.

As described above, the bearing and brake support assembly 32 is relatively simple and inexpensive to manufacture as compared to previously designed bearing and brake support assemblies. Moreover, the bearing and brake support assembly 32 includes a relatively small number of components as compared to previously designed bearing and brake support assemblies.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An articulating work machine, comprising:
   a drive shaft;
   a bearing assembly having an inner race and an outer race, said inner race being secured around said drive shaft;
   a chassis;
   a pivoting frame which pivots relative to said chassis so as to articulate said work machine;
   a one-piece housing having a central passage extending therethrough, wherein (i) said outer race of said bearing assembly is secured to said one-piece housing at a location within said central passage, and (ii) said one-piece housing is secured to said pivoting frame, whereby radial forces exerted on said drive shaft during articulation of said work machine are transferred to said pivoting frame via said one-piece housing;
   a yoke secured to said drive shaft;
   a brake drum secured to said yoke; and
   a brake shoe assembly secured to said one-piece housing, said brake shoe assembly cooperates with said brake drum so as to prevent rotation of said drive shaft.

2. The work machine of claim 1, further comprising:
   a plurality of ball bearings interposed between said inner race and said outer race.

3. The work machine of claim 2, wherein:
   said one-piece housing has a first lubricant channel defined therein,
   said outer race has a second lubricant channel defined therein, and
   said first lubricant channel aligns with said second lubricant channel so as to enable lubrication of said plurality of ball bearings.

4. The work machine of claim 3, further comprising a fitting which is positionable in said first lubricant channel.

5. The work machine of claim 1, wherein:
   said one-piece housing is a cast one-piece housing.

6. The work machine of claim 1, wherein:
   said one-piece housing is made of a ductile iron material.

7. The work machine of claim 1, further comprising (1) a slip shaft having a first end and a second end; and (2) an output shaft of a transmission, wherein:
   said first end of said slip shaft is secured to said yoke, and
   said second end of said slip shaft is secured to said output shaft of said transmission.

8. The work machine of claim 7, further comprising a front axle coupled to said drive shaft, wherein:
   rotation of said output shaft of said transmission causes said front axle to rotate.

9. The work machine of claim 1, wherein (i) said one-piece housing has a plurality of first apertures defined therein, and (ii) said pivoting frame has a plurality of second apertures defined therein, further comprising:
   a plurality of first bolts positioned in said plurality of first apertures and said plurality of second apertures so as to secure said one-piece housing to said pivoting frame.

10. The work machine of claim 9, further comprising a plurality of second bolts, wherein:
    said one-piece housing has a plurality of third apertures defined therein,
    said brake shoe assembly has a plurality of fourth apertures defined therein, and
    said plurality of second bolts are positioned in said plurality of third apertures and said plurality of fourth apertures so as to secure said brake shoe assembly to said one-piece housing.

11. An articulating work machine, comprising:
    a one-piece housing having a central passage extending therethrough;
    a chassis;
    a pivoting frame which pivots relative to said chassis so as to articulate said work machine, said one-piece housing being secured in contact with said pivoting frame, whereby radial forces exerted on said drive shaft during articulation of said work machine are transferred to said pivoting frame via said one-piece housing;
    a bearing assembly secured within said central passage; and
    a brake shoe assembly secured to said one-piece housing.

12. The work machine of claim 11, further comprising a drive shaft, wherein:
    said bearing assembly has an inner race and an outer race, said inner race being secured around said drive shaft, and said outer race being secured to said one-piece housing at a location within said central passage.

13. The work machine of claim 12, further comprising (1) a yoke secured to said drive shaft; and (2) a brake drum secured to said yoke, wherein:
    said brake shoe assembly is secured to said one-piece housing, and
    said brake shoe assembly cooperates with said brake drum so as to prevent rotation of said drive shaft.

14. The work machine of claim 12, further comprising:
    a plurality of ball bearings interposed between said inner race and said outer race.

15. The work machine of claim 12, wherein:
    said one-piece housing has a first lubricant channel defined therein,
    said outer race has a second lubricant channel defined therein, and
    said first lubricant channel aligns with said second lubricant channel so as to enable lubrication of said plurality of ball bearings.

16. The work machine of claim 15, further comprising a fitting which is positionable in said first lubricant channel.

17. The work machine of claim 11, wherein:
    said one-piece housing is a cast one-piece housing.

18. The work machine of claim 11, wherein:
    said one-piece housing is made of a ductile iron material.

19. The work machine of claim 13, further comprising (1) a slip shaft having a first end and a second end; and (2) an output shaft of a transmission, wherein:

said first end of said slip shaft is secured to said yoke, and said second end of said slip shaft is secured to said output shaft of said transmission.

20. The work machine of claim 19, further comprising a front axle coupled to said drive shaft, wherein:

rotation of said output shaft of said transmission causes said front axle to rotate.

* * * * *